(12) United States Patent
Schroeder et al.

(10) Patent No.: US 8,359,009 B2
(45) Date of Patent: Jan. 22, 2013

(54) METHOD FOR THE RELIABLE AND TARGETED SUPPRESSION OF ALARMS IN A MONITORING AND CONTROL CENTER

(75) Inventors: Stefan Schroeder, Bonn (DE); Jens Weber, Nuremberg (DE)

(73) Assignee: Deutsche Telekom AG, Bonn (DE)

( * ) Notice: Subject to any disclaimer, the term of this patent is extended or adjusted under 35 U.S.C. 154(b) by 200 days.

(21) Appl. No.: 12/739,202

(22) PCT Filed: Jun. 6, 2008

(86) PCT No.: PCT/EP2008/004525
§ 371 (c)(1),
(2), (4) Date: Jun. 20, 2010

(87) PCT Pub. No.: WO2009/077014
PCT Pub. Date: Jun. 25, 2009

(65) Prior Publication Data
US 2010/0304715 A1    Dec. 2, 2010

(30) Foreign Application Priority Data

Dec. 17, 2007  (DE) .......................... 10 2007 061 163

(51) Int. Cl.
*H04M 1/66* (2006.01)
(52) U.S. Cl. .................. 455/411; 455/404.1; 455/412.2; 455/414.1; 455/424
(58) Field of Classification Search .... 455/404.1–412.2, 455/414.1–420, 424–426.2
See application file for complete search history.

(56) References Cited

U.S. PATENT DOCUMENTS

| | | | |
|---|---|---|---|
| 3,833,895 A | 9/1974 | Fecteau | |
| 4,090,182 A | 5/1978 | Young | |
| 4,257,038 A | 3/1981 | Rounds | |
| 4,908,604 A | 3/1990 | Jacob | |
| 6,057,764 A | 5/2000 | Williams | |
| 2002/0111698 A1* | 8/2002 | Graziano et al. | 700/17 |
| 2008/0311878 A1* | 12/2008 | Martin et al. | 455/404.1 |

FOREIGN PATENT DOCUMENTS
FR          2582429 B      11/1986

* cited by examiner

*Primary Examiner* — Chuong A Ngo
(74) *Attorney, Agent, or Firm* — Andrew Wilford

(57) ABSTRACT

Authorized or unauthorized opening of access to equipment of a telecommunications network in a control center is detected on the basis of alarm messages. The telecommunication network is a mobile radio network or a hard-wired network. The control center monitors the access equipment and transmits alarm messages as a result of the access equipment being opened. A message is first transmitted by a signaling device to a signaling server before the access equipment is opened. Then the server, after receiving the message from the signaling device, generates an alarm-suppression information item. This alarm-suppression information item is evaluated in the control center, and, whenever an alarm message is received, this message is compared with the alarm-suppression information items and the alarm message is filtered in the event of a positive association.

16 Claims, 4 Drawing Sheets

METHOD FOR THE RELIABLE AND TARGETED SUPPRESSION OF ALARMS IN A MONITORING AND CONTROL CENTER

CROSS REFERENCE TO RELATED APPLICATIONS

This application is the US-national stage of PCT application PCT/EP2008/004525, filed 6 Jun. 2008, published 26 Jun. 2009 as WO2009/077014, and claiming the priority of German patent application 102007061163.5 itself filed 17 Dec. 2007, whose entire disclosures are herewith incorporated by reference.

FIELD OF THE INVENTION

This invention relates to a method of the targeted suppression of an alarm by authorized or unauthorized opening of access to equipment of a telecommunications network in a control center on the basis of alarm messages, the telecommunication is network being in particular a mobile radio network or a hard-wired network, the control center monitoring the access equipment and alarm messages transmitted as a result of the access equipment being opened, characterized in a message is transmitted by a signaling device to a signaling server before the access equipment is opened. In addition, the invention relates to a system for using the method.

Access equipment required to operate a mobile radio network, such as, for example, base, amplifier, or repeater stations, constitute especially sensitive devices that can be attack points for unauthorized interventions into the mobile radio network and the telecommunications therein, which telecommunications have for some time now not simply been speech but a general exchange of data in the mobile radio networks of the second and third generations (2G and 3G networks). An intervention is thus a dangerous attack that can manifest itself, for example, as interception of the communication, insertion or diversion of data packets, or corruption of data. While interception of telecommunications by obtaining personal information constitutes an intrusion into the private sphere, a significantly greater potential danger arises from the manipulation of data, in particular, in regard to the transacting of ordering and payment actions that are today increasingly passed via mobile terminals intended for the mobile radio network, and from the interception of passwords by phishing websites (forged websites).

As a result of the continuously growing transmission of sensitive information over mobile radio networks, more stringent requirements must be met in terms of securing the access points to the mobile radio network. An even greater threat is the fact that with some radio technologies the encryption of user data is done in the base stations and thus any cryptography-relevant data are stored in the base stations. The base stations have very little internal technical security to prevent their penetration. They are protected primarily by relatively weak mechanical security measures (for example locked doors). As a result, protection of sensitive data is not ensured and the attacker can easily obtain entry into the stations and mobile radio network once they have overcome the mechanical protection. An attack here can affect user data her and also other parameters and thus cause serious damage within the network or to other base stations. The monitoring of access points to a mobile radio network has thus become of enormous significance.

The specification and standardization of, among other aspects, mechanical security measures is not the goal of the 3GPP ($3^{rd}$ Generation Partnership Project, a worldwide cooperation on the part of standardization bodies, in particular, for the purpose of standardizing networks of the $2^{nd}$ generation (GSM, Global System of Mobile Communication) and $3^{rd}$ generation (UMTS, Universal Mobile Telecommunication System)). As a result, the manufacturers of network components have often taken proprietary measures that are based on monitoring the opening of the door to the access equipment in what are known as OMCs (Operation Maintenance Centers). These are software-based solutions that only make one contribution to securing the access equipment of mobile radio networks.

In addition to the above-mentioned unauthorized hostile interventions, which are clearly possible, into access equipment of telecommunications networks, authorization-required installation, repair, and maintenance work on the access equipment is also required since it is necessary at regular intervals to replace hardware components, and possibly load the most current firmware, or make repairs in the event of breakdowns. This type of technically required access or intervention into the access equipment, also generally identified as opening the access equipment, must in practice be distinguished from unauthorized hostile intervention.

An approach is known whereby base stations of mobile radio networks and other access equipment of telecommunications networks, for example DLSAMs (Digital Subscriber Line Access Multiplexer, DSL subscriber switching points and exchanges) that are located at non-secured sites, are equipped with opening monitoring devices. This access equipment is generally also called Base Station Access Net (BS-AN). Opening a BS-AN that is secured in this way, i.e. obtaining entry to the rooms housing the sensitive hardware or obtaining access by opening the housing, switchgear cabinet, or directly tapping the hardware, causes an alarm message to appear in the system equipment at the control and monitoring center (OMC, Operational Maintenance Center) responsible for monitoring the BS-AN. It is also possible for multiple alarm messages to be received at different OMCs due to different manufacturers of the secured components.

In order to verify and evaluate whether the alarm message is based on an authorized entry, this entry must be evaluated by the operating personnel of the OMC. This is accomplished by crosschecking the work schedules for on-site deployments. If no deployment recorded at the corresponding BS-AN and correlated by its time occurrence can be associated with the alarm message, there is a suspicion of an unauthorized access or intervention, and thus appropriate measures must be taken to defend against the potential attack.

Generating work schedules and manually crosschecking them with occurring alarm messages is expensive in terms of time and cannot be accomplished at an acceptable cost in time and personnel. In addition, the crosscheck takes time, during which significant damage can already have been caused by the attack. An electronic crosscheck using a computerized solution is also not suitable since work schedule management must be generated in electronic form and must be provided with interfaces to many different OMCs.

In addition, the generation of complete work schedules in advance is not possible in practice since malfunctions and failures can occur suddenly and unexpectedly, and also due to work performed on other BS-ANs or network components, and require rapid and flexible repair work and deployments.

Another aspect that must be considered is that even the crosschecking of work schedules with the issuance of an alarm message does not represent uniquely reliable information about an authorized intervention in a BS-AN since the work schedule only contains information about an opening of a given BS-AN "in the course of the day," and thus provides only vague clues for permissible opening times. What remains unclear specifically is when the opening is to occur. Since an unauthorized opening of a BS-AN, which can cause significant damage with long-term consequences, can occur within only a short time, i.e. during this day on which maintenance and repair work is planned at the relevant BS-AN, these often remain unnoticed and there is a risk that a triggered alarm will be suppressed even for an unauthorized opening of the BS-AN. If it is estimated that one technician opens an average of 10 BS-ANs on one workday and given on average 50 technicians working throughout Germany, unnoticed attacks would be possible on 500 base stations despite the crosscheck of the work schedule. This represents an unacceptable security risk that must be reduced.

Security analyses of current BS-ANs and OMCs have shown that an increase in the security standard and reduction of the security risk are urgently needed.

OBJECT OF THE INVENTION

The object of this invention is thus to reduce in terms of time and personnel the labor cost of detecting whether an opening of access equipment, on which a received alarm message is based, involves an authorized or unauthorized intervention, and thereby to reduce expenses, as well as to minimize the security risk by quickly and reliably detecting an authorized or unauthorized opening, including the risk of unintentionally suppressing the alarm for an unauthorized opening.

SUMMARY OF THE INVENTION AND DETAILED DESCRIPTION

Figure 1:
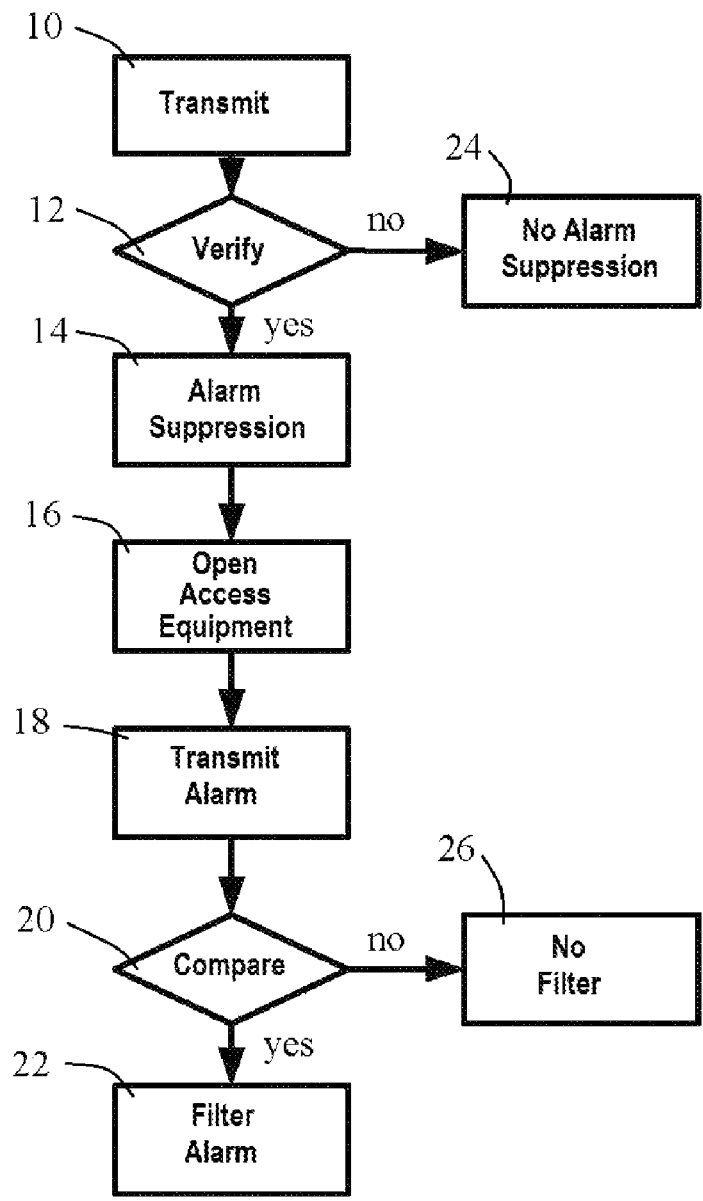
FIG. 1 is a block diagram illustrating the invention.

This object is achieved according to the invention in that a message 42 (FIGS. 2-4) is initially transmitted (see 10 in FIG. 1) by a signaling device 36 (FIGS. 2-4) to a signaling server 40 before the access equipment 30 at the base station is opened so as to effect a targeted suppression of an alarm (14 in FIG. 1) by detecting an authorized or unauthorized access and/or entry into access equipment 30 of a telecommunications network, in particular, of a mobile radio network or a hard-wired network, in the control center 32 monitoring the access equipment 30 on the basis of alarm messages 38 (FIGS. 2-4) that are transmitted (see 18 in FIG. 1) as a result of the access equipment 30 being opened. Before opening, the technician thus indicates to the control and monitoring center (OMC) monitoring the access equipment 30 that he intends to and will open a specific piece of access equipment 30, i.e. intends to and will gain entry or access to the access points of the telecommunications network. The transmission here can pass directly to the signaling server 40 or initially indirectly to a receiver that is associated with the signaling server 40.

The message 42 (FIGS. 2-4) here includes at least information on the identity of the reporting party and the identity of the access equipment 30. In addition to this information, the message can also contain additional data, for example, on the precise beginning time of the maintenance and repair work, or the projected duration, or the end of the work, with the result that a time window is definable within which alarm filtering is to be effected.

The message 42 can be an electronic short-message (SMS), a voice message, or a web-based form. Alternatively, a method comprising single-word recognition, for example, IVR (Interactive Voice Response) can be employed to perform speech-interaction. However, other data formats are also possible.

The signaling device 36 used can be a mobile terminal for the mobile radio network, in particular, a mobile phone, a smartphone, or the mobile wireless data card of a portable computer. The signaling device 36 here preferably complies with the 3GPP security standard. Alternatively or additionally, a signaling device 36 can be provided in the access equipment 30 to function in the event of a local failure of the mobile radio network, which signaling device 36 can be notified about the opening of the access equipment 30 (see 16 in FIG. 1).

The transmission of the message can pass through a secure connection that is in particular secure against being intercepted or having its content changed, and also have replay protection. This achieves a high security standard even when the message is being transmitted. Preferably, a signaling device 36 in compliance with the 3GPP standard can be used in which these security features are provided at a sufficient level. Alternatively or additionally, end-to-end security can be established between the signaling device 36 and signaling server 40.

Figure 2:
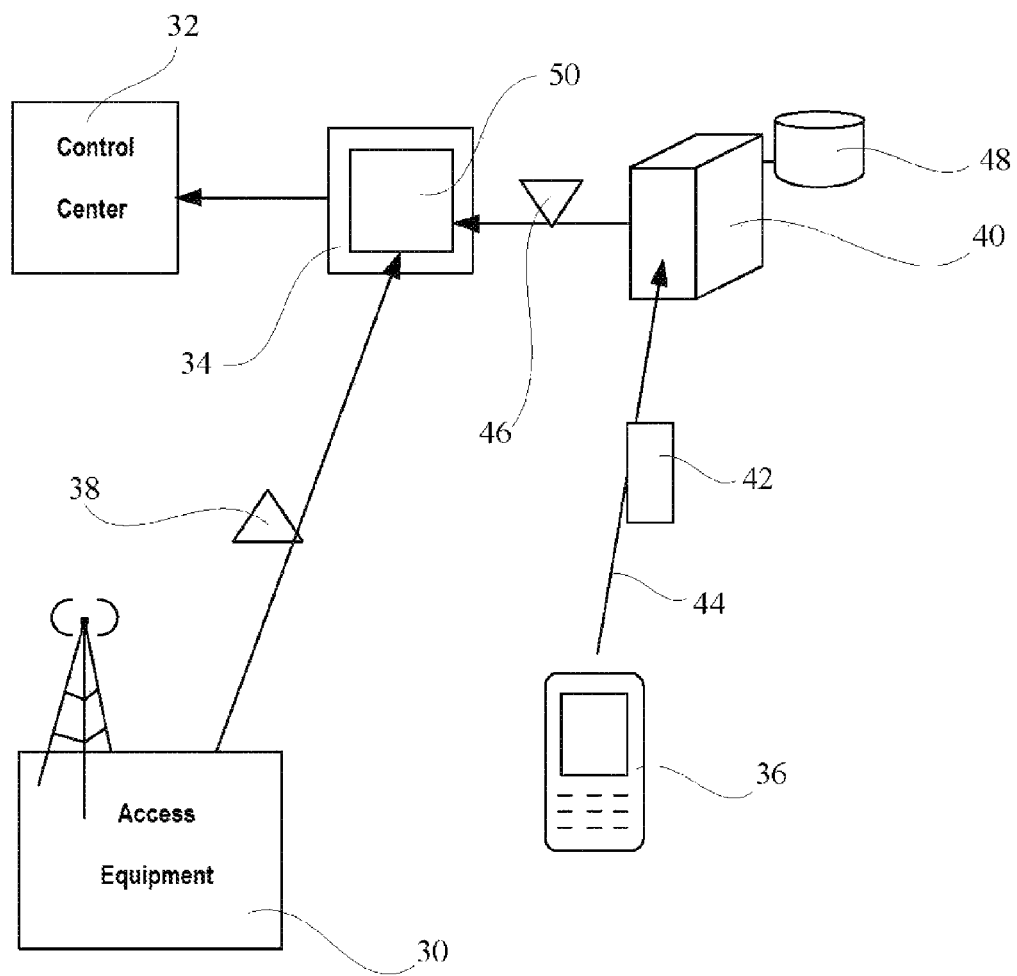
FIGS. 2-4 are schematic diagrams illustrating features of the invention.
Figure 3:
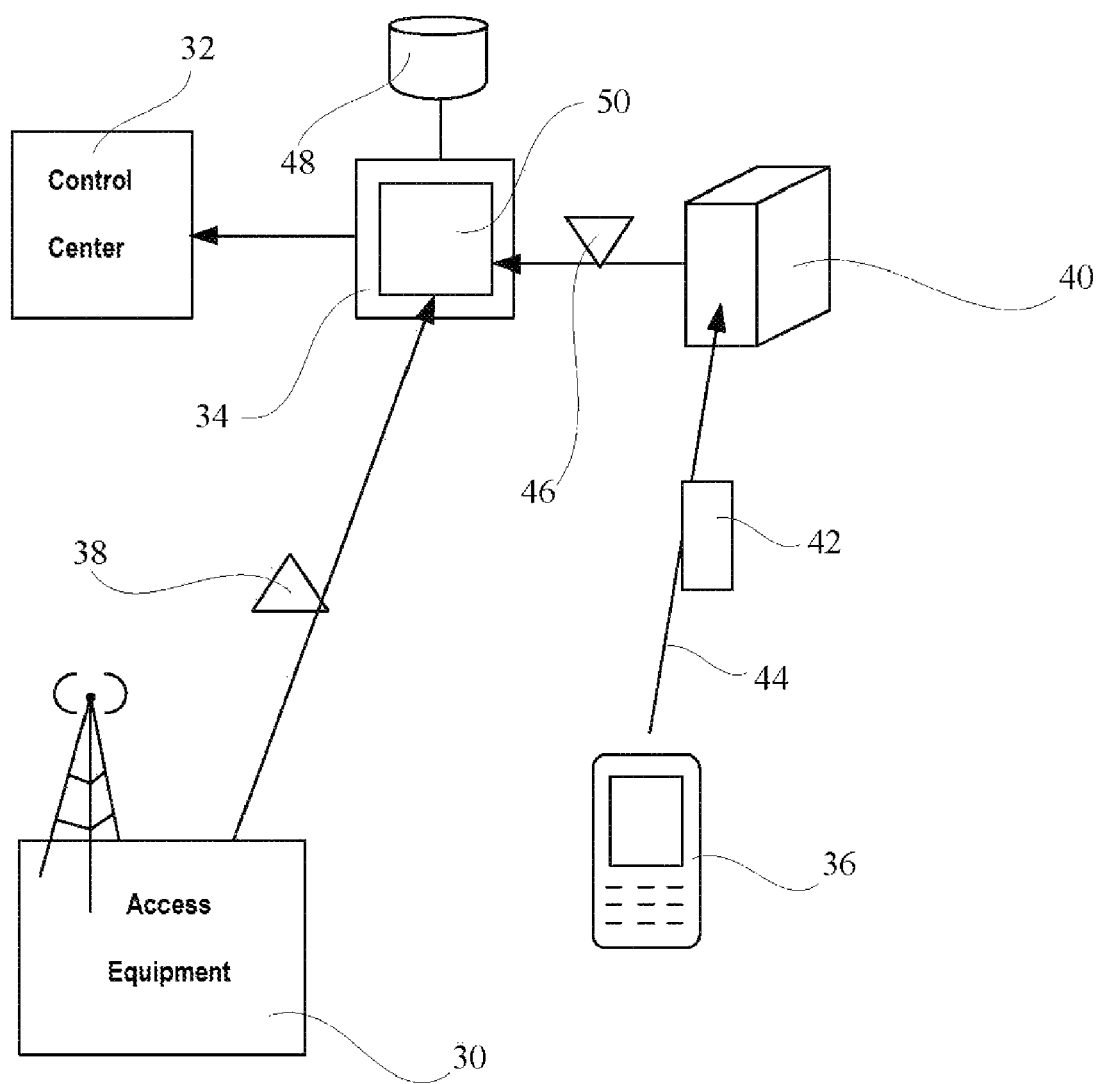
Figure 4:
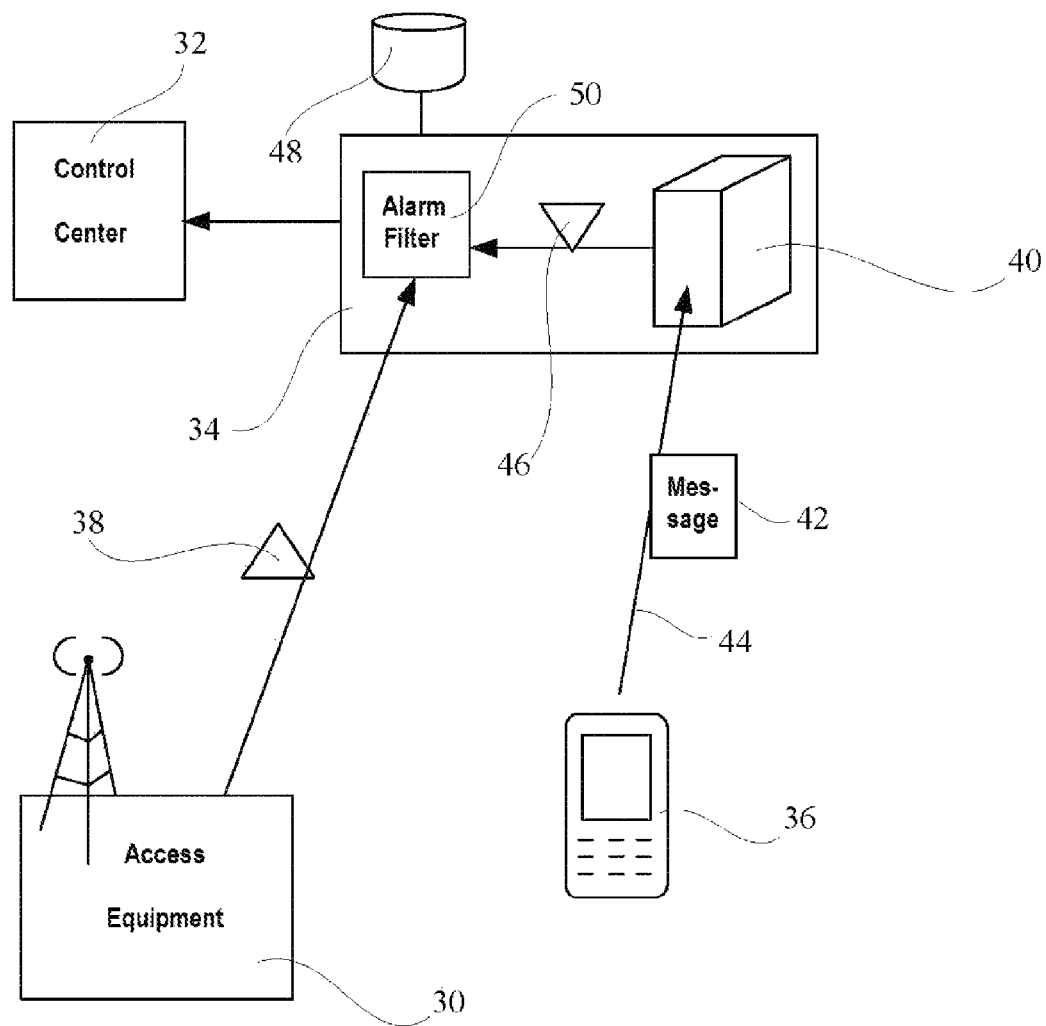

According to the invention, provision is made whereby the signaling server 40 can generate an alarm-suppression information item 46 (FIGS. 2-4). This information item is preferably generated as a function of the data contained in the message, in particular, is generated only when a verification 12 (FIG. 1) of the data contained in the message is effected with a positive result. This verification can include the authentication of the reporting party and/or of the access equipment 30. An especially reliable authentication of the reporting party and/or of the access equipment 30 can preferably be done by the SIM card (Subscriber Identity Module) or the UICC (Universal/UMTS Integrated Circuit Card) of the signaling device 36 that in each case functions to identify a mobile subscriber in the network, and/or by the MSISDN (Mobile Subscriber ISDN number) of the reporting party. The MSISDN is a unique worldwide mobile telephone number that is composed of the country code (CC), the national destination code (NDC), and the subscriber number (SN). Alternatively or in combination with the above, a PIN assigned to the reporting party can also be used for authentication. Alternatively or in combination with the above-mentioned authentication methods, there are additional possible methods that are known in security technology—for example, voice identification or fingerprint verification. Furthermore, an additional authentication of the access equipment 30 can be done by means of an access-equipment identifier assigned to this device.

The authentication can produce a positive result, for example, whenever the person behind the reporting party is identified as a known technician, or whenever in addition the identity of the access equipment 30 matches a piece of actual existing access equipment 30 that is monitored by the called OMC.

In addition, the verification can include an authorization of the reporting party as an alternative or supplement to the authentication. This authorization can, for example, verify whether the reporting party has the requisite security level or general access authorization to open the reported access equipment 30. In addition, it can furthermore be verified whether the identity of the access equipment 30 belongs to a group of identities that are not permitted to respond, or which their opening is limited or prohibited categorically, with the result that in this case the reporting party does not receive authorization (see 24 in FIG. 1).

In supplemental fashion, work schedule information can be used during the authentication or authorization for purposes of plausibility testing. For example, a verification can be made as to whether the technician whose authentication is being performed is actually on duty on the corresponding day and/or in the region in which the access equipment 30 is located. Security can be additionally enhanced this way.

The authorization can, for example, produce a positive result whenever the reporting party has the access rights required to open the access equipment 30, in particular, has the necessary security level and/or access authorization, and the access equipment 30 does not belong to a groups of devices that is categorically locked against ever being opened. In addition, provision can be made whereby the authorization only produces a positive result when the plausibility test has been successful. The authorization itself can be done, for example, by recording the identity of the reporting party—for example, in the form of the MSISDN—in a table of authorized reporting parties.

Preferably, a positive verification can be done whenever a positive authentication and a positive authorization have been made. The signaling server 40 in this case generates an alarm-suppression information item. This can be limited according to the invention in terms of its time validity.

In order to achieve a high degree of security, the starting validity for the alarm-suppression information item can be defined in terms of time by the reporting party, with the result that the alarm-suppression information item is not valid immediately at the time it is generated as this would entail the risk of undetected unauthorized intervention until the time the technician has arrived on site. The reporting party can thus indicate when he intends to open the access equipment 30. In addition, the validity period can be categorically limited by the control center 32, for example, for all messages to a given length of time, for example, one to a few hours. In addition, the time period can also be defined individually by the reporting party and for each deployment, and preferably communicated simultaneously with the message to the control center 32. The reporting party can, for example, select a given validity period from a group of fixed specified time periods, individually specify a time period as a function of the projected duration of the deployment, or communicate the time of the expected end of the work on the access equipment 30. Preferably, the reporting party can select from one of the indicated possibilities.

Supplemental to this selection by the reporting party, it is recommended that a time validity limit always be provided so that no security gap is created in the event the reporting party forgets to select and communicate the end of the validity period. In another variant according to the invention, the end of validity can also be communicated by the reporting party immediately after closing the access equipment 30, thereby enabling the alarm to be re-activated as quickly as possible. This results in the alarm-suppression information item becoming invalid early. The limit on the validity period makes it possible to prevent an attacker from gaining entry or access to the access equipment 30 after the technician leaves.

What is achieved by the limit of the validity is that the alarm-suppression information item retains its validity only as long as absolutely necessary, and the risk is minimized of suppressing an alarm message that is transmitted due to an unauthorized opening of the access equipment 30.

In an alternative or cumulative approach, the service technician can send an alarm-suppression information item with unlimited time validity at the start of his work on site, and then delete this when the work ends by sending a $2^{nd}$ message; in particular, the alarm-suppression information item can be cancelled early if the time limit on the validity of the alarm-suppression information item has not yet been reached whereas the work on site has already been completed.

In the method according to the invention, the alarm-suppression information item is subsequently able to be evaluated in an opening monitoring device 34 (FIGS. 2-4) that is preferably provided within the control center 32 (OMC). This evaluation is done whenever an alarm message is transmitted by access equipment 30. As shown at 20 in FIG. 1, this message is compared with alarm-suppression information items 46 that appeared previously in the signaling server 40, the alarm message being filtered (see 22 in FIG. 1) in the event of a positive association, and not filtered (26 in FIG. 1) for a negative association.

When an alarm message is compared with the alarm-suppression information items 46, the system examines whether a valid alarm-suppression information item is found for the access equipment 30 having transmitted the alarm message at the time of transmission or time when the alarm message was received in the control center 32, i.e. whether the alarm message has occurred within that time window for which an authorization has been requested and granted before the opening of the access equipment 30. If this is the case, a positive association of the alarm message is made with the corresponding alarm-suppression information item. This shows that the action of opening the access equipment 30 with a high degree of probability involves an authorized access or entry, thereby allowing the transmitted alarm message to be suppressed.

A system is furthermore proposed that is constructed to implement the method according to the invention and that allows for a detection of an unauthorized or authorized access and/or entry into access equipment 30 of a telecommunications network, in particular, of a mobile radio network, within the control center 32 monitoring the access equipment 30 on the basis of alarm messages that are transmitted as a result of the access equipment 30 being opened.

The system as shown in FIGS. 2-4 comprises at least: access equipment 30 of a mobile radio network that is constructed to transmit at least one alarm message 38 in the event the device is opened, a signaling device 36 to transmit a message 42 to a signaling server 40, a communications connection 44 to transmit the message, the signaling server 40 being constructed to generate an alarm-suppression information item 46 as a function of the message, as well as an opening monitoring unit 34 to evaluate alarm messages and alarm-suppression information items 46, which monitoring unit 34 when an alarm message is received is constructed to compare it with the available alarm-suppression information items 46 in the database 48 and to filter out the transmitted alarm message in the event of a positive association.

Since the system is constructed to implement the method according to the invention, it includes the same features that have already been described in regard to the method. The signaling device 36 can thus be a mobile terminal for the mobile radio network, in particular, a mobile telephone, smartphone, or a mobile wireless card of a portable computer. In addition, the communications connection 44 between the signaling device 36 and signaling server 40 can be secured, i.e. protected at least against interception, modification of content, and data repetition.

It must be noted that what is understood by a signaling server 40 within the scope of the invention is any technical device that is constructed to receive a message and to generate an alarm-suppression information item 46. The signaling server 40 can be part of the opening monitoring unit 34 of the control center 32; in an alternative variant embodiment, however, it can be constructed independently of this center—for example, as a central server from which alarm-suppression information items 46 are sent to each control center 32 monitoring the access equipment 30 identified in the message.

The signaling server 40 can comprise means for verifying, in particular, to effect authentication and/or authorization. This authentication and/or authorization can be implemented based on the procedural steps already described.

The method is intended in particular for use in protecting mobile radio networks where the access equipment 30 in particular includes base stations of the mobile radio network. However, it can alternatively also be used for any telecommunications network, such as, for example, high-speed data networks for DSL that include sensitive and protection-requiring access points, such as, for example, DSLAMs.

The system can optionally include a database 48 (FIGS. 2-4) that is linked to the signaling server 40 or the opening monitoring unit 34 and includes work schedules relating to the access and/or entry to the access equipment 30. These work schedules can be utilized for the verification.

Additional advantages and preferred embodiments of the invention can be found in the subordinate claims.

The following discussion describes the invention based on a concrete illustrated embodiment.

Regular maintenance work, and repair work in the case of malfunctions or failures, on the access equipment 30 of telecommunications networks are required in practice. The following example refers to a base station BS-AN (Base-Station Access Net) of a mobile radio network, and the method is described based on this example of access equipment 30 and example of a telecommunications network.

If it is necessary for a technician to gain entry or access to a BS-AN, generally characterized as opening the BS-AN, he reports this to the control and monitoring center (OMC platform) responsible for monitoring the BS-AN. This can occur on short notice, i.e. while the technician is traveling to the work site, such that in this case it is not possible to record the deployment in a work schedule.

The message is preferably a short electronic message (SMS), a voice message, or a web-based form that the technician sends from a mobile telephone or from a portable computer that can use a mobile wireless data card to establish a secure connection to a mobile radio network.

The message here is preferably transmitted in encrypted form through a secure communications connection 44 to a signaling server 40 that can generate an alarm-suppression information item and contains information at least on the identity of the technician and of the BS-AN to be opened. This BS-AN is, for example, uniquely identifiable by a special identifier. The reporting party can use a predetermined PIN or MSISDN that he provides specifically in this message. This type of number or identification code can, however, also be sent automatically with the message by the SIM card or UICC of the mobile radio network acting as the identification device, as the result of which the mobile radio terminal is identified within the mobile radio network, and thus the technician is uniquely identified indirectly.

In addition, the technician can also indicate when he will begin work, i.e. when a generated alarm-suppression information item should become valid. In addition, he can also indicate how long his work, which can possibly include multiple openings and closings, will last. This can be done selectively by indicating a time duration for the work, for example 25 minutes, or by indicating a concrete time at which the work will end, for example 3:15 PM. In addition, a selection can also be made from a group of fixed validity periods, for example 30 minutes, 60 minutes, or 90 minutes, etc. that the technician provides in his message. The message can be sent, for example from an adjacent radio cell if a specific BS-AN is defective and no mobile radio coverage exists at that site. In this way, an alarm-suppression information item generated by the signaling server 40 is limited in time.

The signaling server 40, which is preferably a unit that is independent of an opening monitoring unit 34 in the OMC but nevertheless is linked to the opening monitoring unit 34 for purposes of interaction, effects a verification of the message after receiving it. In another variant embodiment, the signaling server 40 can also be part of the opening monitoring unit 34. The verification comprises an authentication of the reporting party based on the transmitted identification number (PIN) or SIM-card identifier or UICC identifier, and of the BS-AN to be opened based on its identifier. A determination is made whether an identification of the reporting party with a technician is possible. If the identification number or SIM-card identifier or UICC identifier can be associated with a technician, and if furthermore the identifier of the BS-AN can be associated with an existing base station that is in fact being monitored by the called OMC, the result of the authentication is positive.

As the next procedural step, an authorization follows the authentication, which authorization consists in the recording in a table of the reporting party's identity, for example, in the form of his MSISDN, and thus of the intended intervention. An additional verification can be made in connection with the authorization as to whether the technician has the access authorization or security level needed to open the requested BS-AN, and/or whether the BS-AN is categorically approved for opening.

In supplemental fashion, during the verification, i.e. during the authentication or authorization, a crosscheck of the message can be made with work schedules listing the technician's deployments for the purpose of plausibility testing, which deployments are provided by a database linked to the signaling server 40, or in this case where the signaling server 40 is part of the opening monitoring unit 34, to the opening monitoring unit 34. As a result, a verification can be made whether the technician who wants to open a BS-AN is actually on duty at the corresponding time, or whether the message involves a fraudulent attempt.

If the verification is positive, i.e. both an association is made of the reported identity of the reporting party with a technician and also an association is made of the BS-AN identifier with a base station monitored by the responsible OMC, and if optionally an authorization is done after utilizing the plausibility test, the signaling server 40 generates an alarm-suppression information item that is valid during the time window that is indicated or selected by the technician, or is determined by the system.

Each alarm-suppression information item is supplied to an opening monitoring unit 34 of the OMC responsible for monitoring the BS-AN. This opening monitoring unit 34 receives alarm messages from all monitored BS-ANs whenever they are opened, and evaluates them by utilizing the alarm-suppression information items 46. This evaluation is done by comparing an incoming alarm message with the found alarm-suppression information items 46 for the BS-AN that has transmitted the alarm message. If an alarm-suppression information item is found that correlates with the time the alarm message was transmitted or received, and if this message was already or is still valid, an authorized opening action exists at the BS-AN and the alarm message can be suppressed or ignored.

If the verification as to whether a valid alarm-suppression information item exists at the time of an alarm message from a BS-AN results in the conclusion that a valid alarm-suppression information item can be associated with the alarm message, which result within the meaning of the invention is called a positive association, the alarm message is suppressed or filtered out by the opening monitoring unit 34, since it has been determined with sufficient reliability that an authorized opening of the BS-AN exists. The opening monitoring unit 34 can thus also be called an alarm filter 50 (FIGS. 2-4).

In another variant embodiment, the opening monitoring unit 34 can also send information to a central OMC, for example, about received alarm messages or alarm-suppression information items 46. Alternatively, the signaling server 40 can also transmit the alarm-suppression information items 46 to the central OMC that manages these in a centralized fashion and notifies the responsible platform OMCs.

The invention claimed is:

1. A method of detecting authorized or unauthorized opening of access to equipment of a telecommunications network in a control center on the basis of alarm messages, the telecommunication network being a mobile radio network or a hard-wired network, the control center monitoring the access equipment and alarm messages transmitted as a result of the access equipment being opened, the method comprising the steps of:
   transmitting a message by a signaling device to a signaling server before the access equipment is opened,
   generating with the server after receiving the message from the signaling device an alarm-suppression information item,
   evaluating the alarm-suppression information item in the control center,
   whenever an alarm message is received, comparing this message with the alarm-suppression information items, and
   filtering the alarm message in the event of a positive association.

2. The method according to claim 1, wherein the signaling device is a mobile telephone, smartphone, or mobile wireless data card of a portable computer is used as the signaling device.

3. The method according to claim 1 wherein the access equipment is a base station of a mobile radio network.

4. The method according to claim 1 wherein the message is transmitted over a secured connection.

5. The method according to claim 1 wherein the message contains information at least regarding the identity of the reporting party and the identity of the access equipment.

6. The method according to claim 1 wherein the message is an electronic message, an e-mail, or a short electronic message (SMS), a voice communication, or a web-based form.

7. The method according to claim 1 wherein the alarm-suppression information item is generated as a function of the message only after positive verification of the message.

8. The method according to claim 7, wherein the verification comprises an authentication of the reporting party or of the access equipment.

9. The method according to claim 7 wherein the verification comprises an authorization of the reporting party.

10. The method according to claim 1 wherein the authorization is utilized for the plausibility testing of work schedule information.

11. The method according to claim 1 wherein the alarm-suppression information item has a time-limited validity.

12. The method according to claim 11, wherein the start of the time-limited validity is able to be determined by the reporting party.

13. The method according to claim 11 wherein the end of the time-limited validity is determinable by the reporting party.

14. The method according to claim 13, wherein the end of the time-limited validity is determinable individually by the reporting party by indicating its duration or by indicating the time at which validity ends, and is communicated with the message, or that the end of validity is communicated by the reporting party immediately after closing the access equipment.

15. The method according to claim 14, wherein a selection can be made at least between indicating the time when the time-limited validity ends and indicating a duration of the time-limited validity.

16. The method according to claim 1, further comprising the steps of:
   when an alarm message is compared with the transmitted alarm-suppression information item, verifying with the system whether a valid alarm-suppression information item exists for the access equipment that transmitted the alarm message at the time of transmission or time when the alarm message was received, and,
   if a valid alarm-suppression information item exists, making a positive association of the alarm message with the corresponding alarm-suppression information item.

* * * * *